United States Patent [19]
Ledvina

[11] 4,149,427
[45] Apr. 17, 1979

[54] CHAIN TENSIONER

[75] Inventor: Timothy J. Ledvina, Ithaca, N.Y.

[73] Assignee: Borg-Warner Corporation, Chicago, Ill.

[21] Appl. No.: 849,296

[22] Filed: Nov. 7, 1977

[51] Int. Cl.² ............................ F16H 7/08; F16H 7/10
[52] U.S. Cl. .............................. 74/242.8; 74/242.11 R
[58] Field of Search ................. 74/242.8, 242.11 R, 74/245 S

[56] References Cited

U.S. PATENT DOCUMENTS

| | | | |
|---|---|---|---|
| 2,492,219 | 12/1949 | Haefeli | 74/243 R |
| 2,747,420 | 5/1956 | Beck | 74/219 |
| 2,780,108 | 2/1957 | Bell | 74/242.8 |
| 2,963,918 | 12/1960 | Blakstad | 74/242.8 |
| 3,479,893 | 11/1969 | Appleton | 74/235 |

Primary Examiner—Leonard H. Gerin
Attorney, Agent, or Firm—Aubrey L. Burgess

[57] ABSTRACT

A chain tensioner and the like for use with an endless chain constructed of a plurality of joined body links and flanking side links which is adapted to mesh with spaced sprockets. The side links have portions which extend radially outwardly and define a channel with the body links. An endless, flexible member is received in the channel having a length no greater than the initial length of the belt.

9 Claims, 2 Drawing Figures

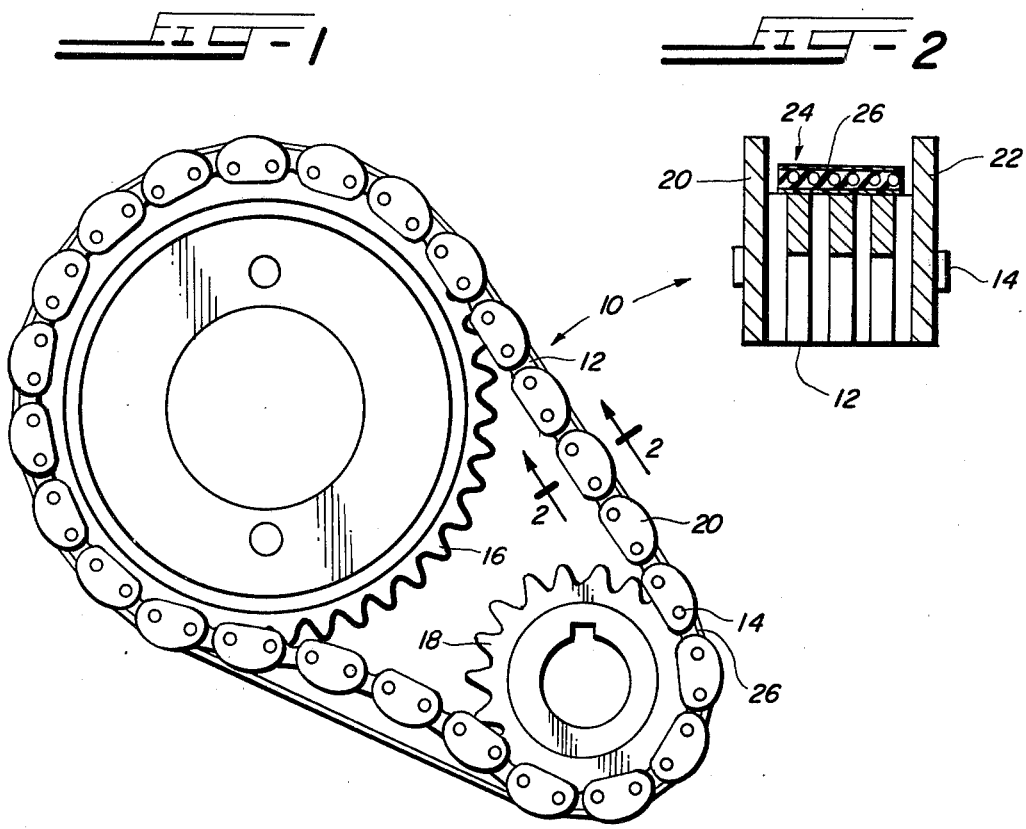

CHAIN TENSIONER

BACKGROUND OF THE INVENTION

Driving chain have a tendency to "snake" especially after the slack side of the chain leaves the driving sprocket. When the snake is controlled or prevented from developing, there is much less difficulty in controlling flutter of the remainder of the slack strand. To alleviate snake and flutter, chain tensioners have been used. These may be of different constructions; for example, idler sprockets on pivoted arms and flexible blades have been used.

THE INVENTION

The invention herein described relates to a chain tensioner of extremely simple construction. It comprises an endless flexible member such as a band, strip or wire received in a channel on the outside of an endless chain. The chain is constructed with side links which extend beyond the body links, which side links together with the body links define the channel. One form of the flexible member is a plastic band of a width substantially matching that of the channel. The length of the flexible member is no greater than the initial length of the chain and may be constructed of a substantially inelastic material, one having little or no elongation characteristic.

THE DRAWING

FIG. 1 is a side elevational view of a typical chain and flexible member tensioner according to this invention; and FIG. 2 is a sectional view taken on line 2—2 of FIG. 1.

DETAILED DESCRIPTION

The chain tensioner of this invention is illustrated in the two figures of the drawing. Shown is an endless chain 10 constructed of a plurality of interlaced body links 12 joined by pivots 14 which permit articulation of the chain on spaced sprockets 16 and 18. The chain has a taught side and a slack side. In addition to the body links 12, the chain 10 is constructed of side links 20 joined to the body links 12 by the pivots 14. The side links 20 have portions 22 which extend beyond the outside of the body links 12 and thus define, with the outside of the body links 12 a channel identified as 24. An endless, flexible member 26, illustrated as a band or belt having length no greater than the initial length of the chain 10 is received in the channel 24 and functions to tension the chain 10, substantially eliminating the tendency of the chain to snake and flutter. The chain links 12 are illustrated as having toes separated by a crotch; this is a silent chain; the invention, however, is applicable to roller chain as well.

Preferably the band or belt 26 is substantially inelastic. The flexible member 26 can take other forms, i.e., one or more cord-like members.

The flexible member 26 carries no appreciable load and during the life of the drive transfers no power, thus it wears little, if any. When new, the chain and belt are the same length. As the chain wears, its overall length is increased. For this worn chain to fit inside the belt, the slack strand of the chain is forced into compression forming an inward arch between the two sprockets. As the chain continues to wear, this arch continues to increase, taking up the wear in the chain drive. The flexible member 26 continues to be effective to substantially eliminate the tendency of the chain to snake and flutter. Regardless of the direction of rotation of the chain, the tensioner is effective without adjustment for rotational direction.

The belt member 26 is constructed much the same as a conventional timing belt. It can be constructed of fiberglass or other known tension cables, neoprene backing encasing the cables, and a wear resistant nylon on one or both faces. The flexible belt member 26 may also be of simpler construction, such as a molded reinforced nylon belt, or fiberglass or the like tension cables encased in an elastomer.

I claim:

1. A chain tensioner and the like for use with an endless chain adapted to mesh with space sprockets and constructed of a plurality of joined body links and flanking side links, said side links having portions extending radially outwardly of said body links to define a channel with said body links and comprising an endless flexible member received in said channel having a length no greater than the initial length of said chain.

2. A chain tensioner as recited in claim 1, wherein said endless flexible member comprises a plastic member.

3. A chain tensioner as recited in claim 1, wherein said endless flexible member comprises a belt or band.

4. A chain tensioner as recited in claim 1, wherein said endless flexible member comprises at least one rod or wire-like member.

5. A chain tensioner as recited in claim 1, wherein said endless flexible member comprises a substantially inelastic member.

6. A chain tensioner as recited in claim 5, wherein said substantially inelastic member comprises a belt or band.

7. A chain tensioner as recited in claim 6, in which said belt comprises a plurality of tension members encased in an elastomer material.

8. A chain tensioner as recited in claim 7, in which said belt also comprises a nylon on at least one face of said belt.

9. A chain tensioner as recited in claim 5, wherein said substantially inelastic member comprises at least one rod or wire-like member.

* * * * *